United States Patent [19]
Sink

[11] Patent Number: 4,853,020
[45] Date of Patent: Aug. 1, 1989

[54] METHOD OF MAKING A CHANNEL TYPE ELECTRON MULTIPLIER

[75] Inventor: Ronald A. Sink, Roanoke, Va.

[73] Assignee: ITT Electro Optical Products, A Division of ITT Corporation, Roanoke, Va.

[21] Appl. No.: 147,068

[22] Filed: Jan. 25, 1988

Related U.S. Application Data

[63] Continuation of Ser. No. 781,842, Sep. 30, 1985, abandoned.

[51] Int. Cl.[4] .......... C03C 25/06
[52] U.S. Cl. .......... 65/4.1; 65/4.2; 65/4.3; 65/31; 65/36
[58] Field of Search .......... 65/4.1, 4.2, 4.3, 17, 65/32, 36, 31

[56] References Cited

U.S. PATENT DOCUMENTS

| | | | |
|---|---|---|---|
| 3,279,903 | 10/1966 | Siegmund | 65/56 |
| 4,005,323 | 1/1977 | Yates et al. | 65/36 |
| 4,021,216 | 5/1977 | Asam et al. | 65/31 |
| 4,031,423 | 6/1977 | Siegmund | 65/4.2 |
| 4,101,303 | 7/1978 | Backwill | 65/31 |
| 4,126,804 | 11/1978 | Asam et al. | 313/105 |
| 4,175,940 | 11/1979 | Siegmund | 65/4.2 |
| 4,385,092 | 5/1983 | Singer, Jr. | 65/4.21 |
| 4,389,089 | 6/1983 | Strack | 65/4.21 |
| 4,650,509 | 3/1987 | Vanbragt | 65/4.1 |
| 4,682,849 | 7/1987 | Kowata et al. | 65/4.21 |
| 4,710,216 | 12/1987 | Harada et al. | 65/4.1 |
| 4,767,430 | 8/1988 | Deneka et al. | 65/4.21 |

FOREIGN PATENT DOCUMENTS

| | | |
|---|---|---|
| 1302152 | 1/1973 | United Kingdom . |
| 2119361 | 11/1983 | United Kingdom . |

*Primary Examiner*—David L. Lacey
*Assistant Examiner*—L. Johnson
*Attorney, Agent, or Firm*—Thomas N. Twomey; Mary C. Werner

[57] ABSTRACT

A microchannel electron multiplier is formed by placing into a glass tube a plurality of bundles optical fibers, each having an etchable glass core and a glass cladding which is non-etchable when subjected to the conditions used for etching the core material. The fiber bundles located around the inside edge of the glass tube are replaced by support fibers having both a core and a cladding of a material which is non-etchable under the above-described conditions. The assembly of the tube, bundles and support fibers is heated to fuse the tube, bundles and support fibers together. The etchable core material is then removed and the assembly sliced into wafers. The inner surface of each of the claddings which bound the channel formed after removal of the core material is rendered electron emissive by reduction of the lead oxide by hydrogen gas. Metal films are deposited onto the opposed surfaces of each of the wafers to form contacts.

11 Claims, 1 Drawing Sheet

METHOD OF MAKING A CHANNEL TYPE ELECTRON MULTIPLIER

This application is a continuation of application Ser. No. 781,842, filed Sept. 30, 1985, now abandoned.

BACKGROUND OF THE INVENTION

This invention relates to electron multipliers, and more particularly, to a channel-type electron multiplier and an image tube or the like incorporating the same.

Microchannel plate electron multiplier devices provide exceptional electron amplification but are generally limited in application because of their delicate glass structure. The device basically consists of a honeycomb configuration of continuous pores through a thin glass plate. Secondary emissive properties are imparted to the walls either by chemically treating the glass walls of the pores or coating an emissive layer thereon. Electrons transported through the pores subsequently generate large numbers of free electrons by multiple collisions with the electron emissive internal pore surface.

However, there are problems associated with the forming of the microchannel plates. In one method employed, a plurality of optical fibers are enclosed within an envelope structure and the structure and fibers are heated to fuse the fibers together. Problems arose because the fibers would become distorted and/or broken during the fusion process.

U.S. Pat. No. 4,021,216 of A. Asam et al entitled "Method for Making Strip Microchannel Electron Multiplier Array" is one attempt to solve this problem and is directed to a linear array of electron multiplier microchannels sandwiched between a pair of glass plate support members. The present invention takes a different approach to this problem.

OBJECTS OF THE INVENTION

It is an object of the present invention to provide a method of forming microchannel plates which overcomes the disadvantages of the prior art.

It is an additional object of the present invention to provide a microchannel plate in which the area surrounding the edges of the plate is substantially free from distortions.

It is still another object of the present invention to provide a microchannel plate in which broken channel walls are substantially eliminated.

SUMMARY OF THE INVENTION

These objects and others which will become apparent hereinafter are accomplished by the present invention which provides a method of forming a microchannel plate in which a plurality of optical fibers, formed of core material which is etchable and cladding material which is non-etchable when subjected to the conditions used for etching the core material, are surrounded by an outer layer of support structures which protect and cushion the optical fibers during the fusion process to substantially eliminate broken channel walls and distortion of the optical fibers.

BRIEF DESCRIPTION OF THE DRAWING

The above-mentioned and other features and objects of this invention will become more apparent by reference to the following description taken in conjunction with the accompanying drawings in which.

DETAILED DESCRIPTION OF THE PREFERRED EMBODIMENT

Figure 1:
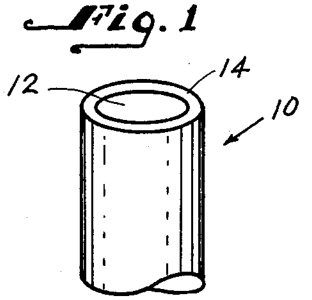
FIG. 1 is a perspective view of a clad fiber having a circular configuration.

In FIG. 1 there is shown a starting fiber 10 for the microchannel plate of this invention. The fiber 10 includes a glass core 12 and a glass cladding 14 surround the core. The core 12 is made of a material that is etchable in an appropriate etching solution such that the core can be subsequently removed during the inventive process. The glass cladding 14 is made from a glass which has a softening temperature substantially the same as the glass core 12. The glass material of the cladding 14 is different from that of the core 12 in that it has a higher lead content which renders it non-etchable under those conditions used for etching the core material. Thus, the cladding 14 remains after the dissolution or etching of the glass core 12 and becomes a boundary for the channel which is left. A suitable cladding glass is a lead-type glass such as Corning Glass 8161. The lead oxide is subsequently reduced in the final stages of the manufacturing process to make the inner surfaces of each of the fibers 10 capable of the emission of secondary electrons.

The optical fibers 10 are formed in the following manner. An etchable glass rod and a cladding tube coaxially surrounding the rod are suspended vertically in a draw machine which incorporates a zone furnace. The temperature of the furnace is elevated to the softening temperature of the glass. The rod and tube fuse together and are drawn into the single fiber 10. The fiber 10 is fed into a traction mechanism where the speed is adjusted until the desired fiber diameter is achieved. The fiber 10 is then cut into shorter lengths of approximately 18 inches.

Figure 2:
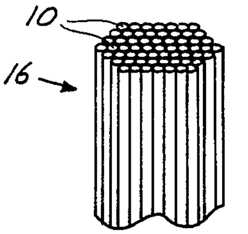
FIG. 2 is a perspective view of a clad fiber bundle having a hexagonal configuration.

Several thousands of the cut lengths of the single fiber 10 are then stacked into a graphite mold and heated to the softening temperature of the glass in order to form a hexagonal array 16 as shown in FIG. 2 wherein each of the cut length of the fiber 10 has a hexagonal configuration. The hexagonal configuration provides a better stacking arrangement.

The hexagonal array 16, which array is also known as a multi assembly or bundle, includes several thousand single fibers 10 each having the core 12 and the cladding 14. This multi assembly 16 is suspended vertically in a draw machine and drawn to again decrease the fiber diameter while still maintaining the hexagonal configuration of the individual fibers. The multi assembly 16 is then cut into shorter lengths of approximately 6 inches.

Figure 3:
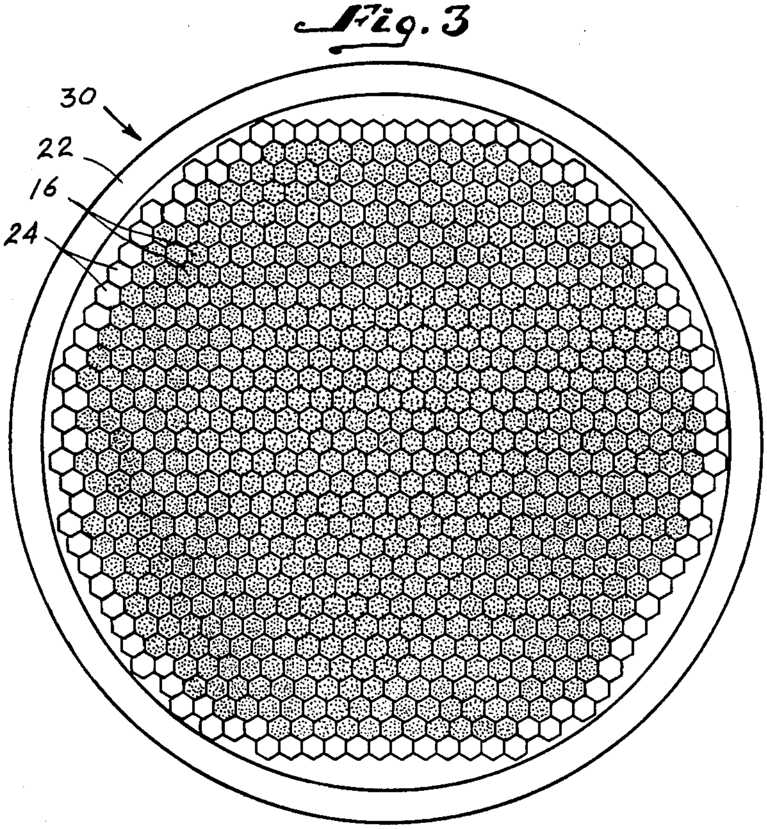
FIG. 3 is a cross-sectional view of a glass tube packed with multi fibers and support fibers after etching.

Several hundred of the cut multi assemblies 16 are packed into a precision inner diameter bore glass tube 22 as shown in FIG. 3. The glass tube 22 has a high lead content and is made of a glass material which is similar to the glass cladding 14 and is thus non-etchable by the process used herein to etch away the glass core 12. The tube 22 has a coefficient of expansion which is approximately the same as that of the fibers 10. The lead glass tube 22 will eventually become the solid rim border of the microchannel plate.

In order to protect the fibers 10 of each multi assembly 16 during processing to form the microchannel plate, a plurality of support structures are positioned in the glass tube 22 to relace those multi assemblies 16 which form the outer layer of the assembly. The support structures may take the form of hexagonal rods of any material having the necessary strength and the capability to fuse with the glass fibers. The material should have a temperature coefficient close enough to that of the glass fibers to prevent distortion of the latter during temperature changes. In one embodiment, each support structure may be a single optical glass fiber 24 of hexagonal shape and a cross-sectional area approximately as large as that of one of the multi assemblies 16, the single fiber having a core and a cladding which are both non-etchable under the aforementioned conditions where the cores 12 are etched. The optical fibers 24 are illustrated in FIG. 3. Both the rod which forms the core and the glass tube which forms the cladding of the support optical fibers 24 are made of the same high lead content glass material as the glass cladding 14 of the fibers 10. These support fibers 24 will form a cushioning layer between the tube 22 and the multi assemblies 16 so that during a later heating step, distortion of the area adjacent the inner surface of the glass tube 22 is substantially eliminated. The glass rod and tube which will form the core and the cladding of the support fiber 24 are suspended in a draw furnace and heated to fuse the rod and tube together and to soften the fused rod and tube sufficiently to form a fiber. The so formed support fibers 24 are then cut into lengths of approximately 18 inches and subjected to a second draw to achieve the desired geometric configuration and smaller outside diameter which is substantially the same as the outside diameter of each of the multi assemblies 16. The support structures may be formed from one optical fiber or any number of fibers up to several hundred. The final geometric configuration and outside diameter of one support structure should be substantially the same as one multi assembly 16. The multiple fiber support structure may be formed in a manner similar to that of the multi assembly 16.

Each multi assembly 16 which forms the outermost layer of fibers in the tube 22 is replaced by a support optical fiber 24. This is preferably done by positioning one end of a support fiber 24 against one end of a multi assembly 16 which is to be replaced and pushing the support fiber 24 against the multi assembly 16 until the multi assembly 16 is out of the tube 22. The assembly formed when all of the outer multi assemblies 16 have been replaced by the support fibers 24 is called a boule.

The boule 30 is inserted into a lead glass envelope tube (not shown) which has one open end. The envelope tube has a softening point similar to that of the support fibers 24 and multi fiber array 16. The boule 30 is then suspended in a furnace and the open end of the lead glass envelope tube connected to a vacuum system. The temperature of the furnace is elevated to the softening point of the material of the multi assembly 16 and the support fibers 24. The multi fiber assemblies 16 fuse together, and the support fibers 24 fuse to the multi assemblies 16 and to the glass tube 22.

During this heating step, the support fibers 24 act as a cushion between the rim of the glass tube 22 and the multi assembly 16. This cushioning provides structural support so that the individual fibers 10 do not distort during the heat treatment. In addition, the cushioning effect of the support fibers 24 makes it possible to use a higher heat during fusion without causing distortion of the fibers 10. During the heating step the lead glass envelope adheres to the glass tube 22 but does not form a good interface therewith. In order to prevent problems during later stages of processing, the lead glass envelope is ground away after the heat treatment.

The fused boule 30 is then sliced into thin cross-sectional plates. The planar end surfaces are ground and polished.

Figure 4:
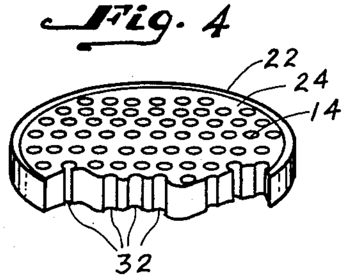
FIG. 4 is a perspective view of a section of the microchannel plate after etching and slicing.

In order to form the microchannels, the cores 12 of the fibers 10 are removed, preferably by etching with dilute hydrochloric acid. After etching, the high lead content glass claddings 14 will remain to form the microchannels 32 as is illustrated in FIG. 4. Also, the support fibers 24 remain solid and thus provide a good transition from the solid rim of the tube 22 to the microchannels 32.

After etching, the plates are placed in an atmosphere of hydrogen gas whereby the lead oxide of the non-etched lead is reduced to render the cladding electron emissive. In this way, a semiconducting layer is formed in each of the glass claddings 14, which layer extends inwardly from the surface which bounds the microchannel 32. Because the support fibers 24 are not etched and remain solid, the active area of the microchannel plate is decreased. In this way also there are less channels to outgas. Additionally, while the plate must be made to a predetermined outside diameter so that it can be accommodated in an image intensifier tube, the area along the rim of the plate is not used since it is blocked by internal structures in the tube. Therefore, reducing the active area of the plate at the rim is advantageous since the microchannels in that area are not needed.

Thin metal layers are applied as electrical contracts to each of the planar end surfaces of the microchannel plate which provide entrance and exit paths for electrons when an electric field is established across the microchannel plate by means of the metallized contacts. The metal of the contacts may be nickel chromium.

Figure 5:
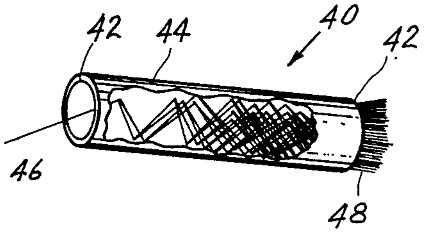
FIG. 5 is a perspective view of a microchannel.

FIG. 5 illustrates one completed microchannel 40 showing metal contact layers 42 and a semiconducting layer 44 which surrounds the channel. A primary electron 46 is multiplied during its passage through the channel 40 into the output electrons 48 by means of the semiconducting layer 44 and the potential difference between the contact layers 42.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A method of forming a fused structure for making a microchannel plate comprising the steps of:
   - forming a plurality of optical fibers each having a core fabricated of an etchable material and a cladding fabricated of a non-etchable material surrounding the core;
   - positioning the plurality of optical fibers together to form an assembly;
   - placing the assembly into a tube;
   - fabricating a plurality of support rods solely of a non-etchable material and replacing the optical fibers along the longitudinal outer periphery of the assembly by the support rods in order to prevent distortion of the optical fibers during subsequent fabrication steps;

fusing together the assembly, support rods and tube to form a fused structure; and removing the etchable material from the fused structure.

2. The method of claim 1 wherein the fusing step includes forming each of the support rods to have substantially the same cross-sectional area as one of the optical fibers.

3. The method of claim 1 wherein the fusing step includes making each of the support rods from a plurality of fused optical fibers, each of said fused optical fibers having a core and a cladding surrounding the core.

4. The method of claim 1 wherein the fusing step includes making each of the support rods from an optical fiber having a core and a cladding surrounding the core.

5. A method of forming a microchannel electron multiplier comprising the steps of:

forming a fused structure comprising a plurality of bundles of fused optical fibers, a tube enclosing the bundles, a plurality of support rods fabricated entirely of a non-etchable material positioned between the outer surface of the bundles and the inner surface of the tube, each of the optical fibers having a core fabricated of an etchable material and a cladding surrounding the core fabricated of a non-etchable material;

removing the etchable material from the fused assembly to form channels therethrough;

retaining the support rods in the fused assembly; and treating the inner surface of at least some of the claddings to render the surface electron emissive.

6. The method of claim 5 wherein said forming step includes placing a plurality of bundles of the optical fibers into the tube and replacing at least some of the bundles which are positioned along the periphery of the plurality with support rods and heating together the tube, the bundles of optical fibers and support rods to form a fused structure, the support rods preventing distortion of the optical fibers.

7. The method of claim 5 wherein said removing step includes etching.

8. The method of claim 5 further comprising, before said removing step, slicing the assembly to form wafers having opposed surfaces.

9. The method of claim 8 further comprising the step of applying electrodes to the opposed surfaces.

10. The method of claim 6 wherein the optical fiber claddings are a lead oxide material.

11. The method of claim 10 wherein said treating step includes reducing the lead oxide material of the optical fiber cladding in hydrogen gas to form an electron emissive layer.

* * * * *

Adverse Decisions in Interference

Patent No. 4,853,020, Ronald R. Sink, METHOD OF MAKING A CHANNEL TYPE ELECTRON MULTIPLIER, Interference No. 104,049, final judgment adverse to the patentees rendered March 18, 2003, as to claims 5 and 7-9.

*(Official Gazette March 20, 2007)*